US009050956B2

(12) United States Patent
Hotani et al.

(10) Patent No.: US 9,050,956 B2
(45) Date of Patent: Jun. 9, 2015

(54) BRAKE DEVICE FOR VEHICLE (75) Inventors: Yuki Hotani, Saitama (JP); Naoto Ohkubo, Saitama (JP); Yuki Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/982,305

(22) PCT Filed: Jan. 24, 2012

(86) PCT No.: PCT/JP2012/051464
§ 371 (c)(1),
(2), (4) Date: Sep. 25, 2013

(87) PCT Pub. No.: WO2012/105379
PCT Pub. Date: Aug. 9, 2012

(65) Prior Publication Data
US 2014/0008966 A1 Jan. 9, 2014

(30) Foreign Application Priority Data

Jan. 31, 2011 (JP) ................................. 2011-017716

(51) Int. Cl.
*B60T 11/20* (2006.01)
*B60T 15/00* (2006.01)
(Continued)

(52) U.S. Cl.
CPC .............. *B60T 15/00* (2013.01); *B60T 8/4081* (2013.01); *B60T 13/662* (2013.01); *B60T 13/745* (2013.01);
(Continued)

(58) Field of Classification Search
CPC ... B60T 13/745; B60T 8/4081; B60T 13/662; B60T 7/042; B60T 15/00; B60T 17/221; B60T 17/223; B60T 2270/82; B60T 2270/40; B60W 10/02; B60L 2240/421; B60L 2240/461; B60L 2250/26; Y02T 10/642

USPC ............... 303/14, 3, 10, 11, 20, 116.1, 116.4, 303/122.04, 122.05, 122.09, 122.1, 122.11, 303/122.12, 122.13, 122.14; 60/567, 582
See application file for complete search history.

(56) References Cited

U.S. PATENT DOCUMENTS 7,988,241 B2   8/2011   Ishii
8,550,573 B2 * 10/2013   Hatano .................... 303/122.04
(Continued)

FOREIGN PATENT DOCUMENTS

CN   101821139 A   9/2010
DE   101 23 599 A1   8/2002
(Continued)

OTHER PUBLICATIONS

Supplementary European Search Report issued Jun. 18, 2014 in the corresponding EP Patent Application 12 74 2537.
(Continued)

*Primary Examiner* — Pamela Rodriguez
(74) *Attorney, Agent, or Firm* — Carrier Blackman & Associates, P.C.; Joseph P. Carrier; Jeffrey T. Gedeon (57) ABSTRACT

A brake device for a vehicle is provided in which when there is an abnormality in which a slave cylinder becomes incapable of being actuated, a wheel cylinder is actuated using a brake fluid pressure generated by a master cylinder, which is actuated by a brake pedal. Since an idling detector detects idling of a motor when the rotational speed of the motor is greater than a reference value that is set according to the stroke of the slave cylinder, it is possible to reliably and rapidly detect idling of the motor. When the idling of the motor is detected, since a control device opens a master cut valve and the wheel cylinder is actuated by the brake fluid pressure generated by the master cylinder, the slave cylinder, which has become incapable of being actuated, can be backed up rapidly by the master cylinder.

5 Claims, 7 Drawing Sheets

(51) Int. Cl.
  *B60T 8/40* (2006.01)
  *B60T 13/66* (2006.01)
  *B60T 13/74* (2006.01)
  *B60T 17/22* (2006.01)
  *B60T 7/04* (2006.01)

(52) U.S. Cl.
  CPC ......... *B60T 17/221* (2013.01); *B60T 2270/402* (2013.01); *B60L 2240/421* (2013.01); *B60L 2240/461* (2013.01); *B60L 2250/26* (2013.01); *Y02T 10/642* (2013.01); *B60T 7/042* (2013.01); *B60T 17/223* (2013.01); *B60T 2270/82* (2013.01); *B60T 2270/40* (2013.01)

(56) References Cited

U.S. PATENT DOCUMENTS

| | | | |
|---|---|---|---|
| 8,827,378 | B2 | 9/2014 | Toyohira et al. |
| 2006/0082217 | A1* | 4/2006 | Hatano et al. ................. 303/122 |
| 2007/0035179 | A1 | 2/2007 | Kling et al. |
| 2008/0210496 | A1 | 9/2008 | Ishii |
| 2010/0176653 | A1 | 7/2010 | Arakawa |
| 2010/0187899 | A1 | 7/2010 | Suzuki |
| 2010/0206673 | A1 | 8/2010 | Hitzel et al. |
| 2012/0000738 | A1 | 1/2012 | Inoue et al. |
| 2012/0313427 | A1* | 12/2012 | Nishioka et al. ................. 303/10 |

FOREIGN PATENT DOCUMENTS

| | | |
|---|---|---|
| DE | 10 252 728 A1 | 2/2004 |
| DE | 10 2008 039960 A1 | 3/2009 |
| EP | 1 219 516 A2 | 7/2002 |
| EP | 1 970 271 A1 | 9/2008 |
| EP | 2 078 649 A1 | 7/2009 |
| JP | H04-169368 A | 6/1992 |
| JP | H09-109877 A | 4/1997 |
| JP | 2005-343366 A | 12/2005 |
| JP | 2007-060761 A | 3/2007 |
| JP | 2008-174169 A | 7/2008 |
| JP | 2008-230362 A | 10/2008 |
| JP | 2009-029372 A | 2/2009 |
| WO | 2005/005215 A2 | 1/2005 |
| WO | 2010/107067 A1 | 9/2010 |

OTHER PUBLICATIONS

Official Communication from the Chinese Patent Office in regards to corresponding Chinese Patent Application No. 201280005500.3 dated Dec. 26, 2014.

* cited by examiner

FIG.1
WHEN POWER SOURCE IS OFF

FIG.3

FIG.4 — WHEN THERE IS ABNORMALITY

BRAKE DEVICE FOR VEHICLE

TECHNICAL FIELD

The present invention relates to a so-called BBW (brake-by-wire) type brake device in which an amount of operation of a brake pedal by a driver is converted into an electrical signal to thus actuate a slave cylinder, and a wheel cylinder is actuated by a brake fluid pressure generated by the slave cylinder.

BACKGROUND ART

With regard to such a BBW type brake device, an arrangement in which a slave cylinder that is actuated by an electrical signal corresponding to an amount of operation of a brake pedal to thus generate a brake fluid pressure is formed from a cylinder, a piston slidably fitted into the cylinder, a motor, and a speed reduction mechanism that reduces the speed of rotation of the motor and converts it into reciprocating movement of the piston is known from Patent Document 1 below.

RELATED ART DOCUMENTS

Patent Documents

Patent Document 1: Japanese Patent Application Laid-open No. 2005-343366

SUMMARY OF THE INVENTION

Problems to be Solved by the Invention

When a motor comes off a slave cylinder housing, or a gear of a speed reduction mechanism is damaged or does not mesh properly and the motor idles, although the motor rotates, the slave cylinder might not be able to generate a brake fluid pressure. In such a case, since the motor is rotating, a control device cannot determine that there is an abnormal state, a delay is caused in switching from braking by means of brake fluid pressure generated by the slave cylinder to braking by means of brake fluid pressure generated by a master cylinder, and the driver might experience an uncomfortable sensation.

The present invention has been accomplished in light of such circumstances, and it is an object thereof to enable back up by means of a brake fluid pressure generated by a master cylinder when a slave cylinder motor is idling to be carried out rapidly.

Means For Solving the Problems

In order to attain the above object, according to a first aspect of the present invention, there is provided a brake device for a vehicle comprising a master cylinder that generates a brake fluid pressure by operation of a brake pedal, a stroke simulator that imparts a reaction force to the operation of the brake pedal, a wheel cylinder that brakes a wheel, a master cut valve that is capable of blocking a fluid path providing a connection between the master cylinder and the wheel cylinder, a slave cylinder that is disposed between the master cut valve and the wheel cylinder and generates a brake fluid pressure that is commensurate with the operation of the brake pedal, control means that, when the brake pedal is operated, closes the master cut valve and actuates the slave cylinder in a state in which the stroke simulator is capable of being actuated, and idling detection means that detects idling of a motor of the slave cylinder, wherein when the idling detection means detects idling of the motor, the control means opens the master cut valve and actuates the wheel cylinder by means of brake fluid pressure generated by the master cylinder.

Further, according to a second aspect of the present invention, in addition to the first aspect, the idling detection means detects idling of the motor when a rotational speed of the motor is larger than a reference value that is set according to a stroke of the slave cylinder.

Furthermore, according to a third aspect of the present invention, in addition to the first aspect, the idling detection means detects idling of the motor by comparing a torque current value and an indicated voltage value of the motor.

Moreover, according to a fourth aspect of the present invention, in addition to the first aspect, the brake device comprises auxiliary braking means that carries out braking of a wheel in place of the slave cylinder until the master cut valve is opened.

It should be noted here that first and second master cut valves 32 and 33 of an embodiment correspond to the master cut valve of the present invention, an electronic control unit U of the embodiment corresponds to the control means of the present invention, and a drive motor of the embodiment corresponds to the auxiliary braking means of the present invention.

Effects of the Invention

In accordance with the first arrangement of the present invention, when the situation is normal, in a state in which the master cut valve is closed so as to block the fluid path providing a connection between the master cylinder and the slave cylinder, the slave cylinder is driven according to the amount of operation of the brake pedal by a driver, the wheel cylinder is actuated by the brake fluid pressure generated by the slave cylinder, and a reaction force is imposed on operation of the brake pedal by means of the stroke simulator. When there is an abnormality in which the slave cylinder becomes incapable of being actuated, the wheel cylinder is actuated by means of the brake fluid pressure generated by the master cylinder, which is actuated by the brake pedal. When the idling detection means detects idling of the motor of the slave cylinder, since the control means opens the master cut valve and the wheel cylinder is actuated by means of the brake fluid pressure generated by the master cylinder, the slave cylinder, which has become incapable of being actuated, can be backed up rapidly by the master cylinder.

Furthermore, in accordance with the second arrangement of the present invention, since the idling detection means detects idling of the motor when the rotational speed of the motor is greater than the reference value that is set according to the stroke of the slave cylinder, it is possible to reliably and rapidly detect idling of the motor.

Moreover, in accordance with the third arrangement of the present invention, since the idling detection means detects idling of the motor by comparing the torque current value and the indicated voltage value of the motor, it is possible to reliably and rapidly detect idling of the motor.

Furthermore, in accordance with the fourth arrangement of the present invention, since the auxiliary braking means carries out braking of the wheel in place of the slave cylinder until the master cut valve is opened, it is possible to minimize the amount of decrease in deceleration accompanying switching from braking by means of the slave cylinder to braking by means of the master cylinder.

EXPLANATION OF REFERENCE NUMERALS AND SYMBOLS

11 Master cylinder
12 Brake pedal
26 Wheel cylinder
27 Wheel cylinder
30 Wheel cylinder
31 Wheel cylinder
32 First master cut valve (master cut valve)
33 Second master cut valve (master cut valve)
35 Stroke simulator
42 Slave cylinder
44 Motor
M1 Idling detection means
U Electronic control unit (control means)

MODES FOR CARRYING OUT THE INVENTION

A first embodiment of the present invention is explained below by reference to FIG. 1 to FIG. 7.

First Embodiment

Figure 1:
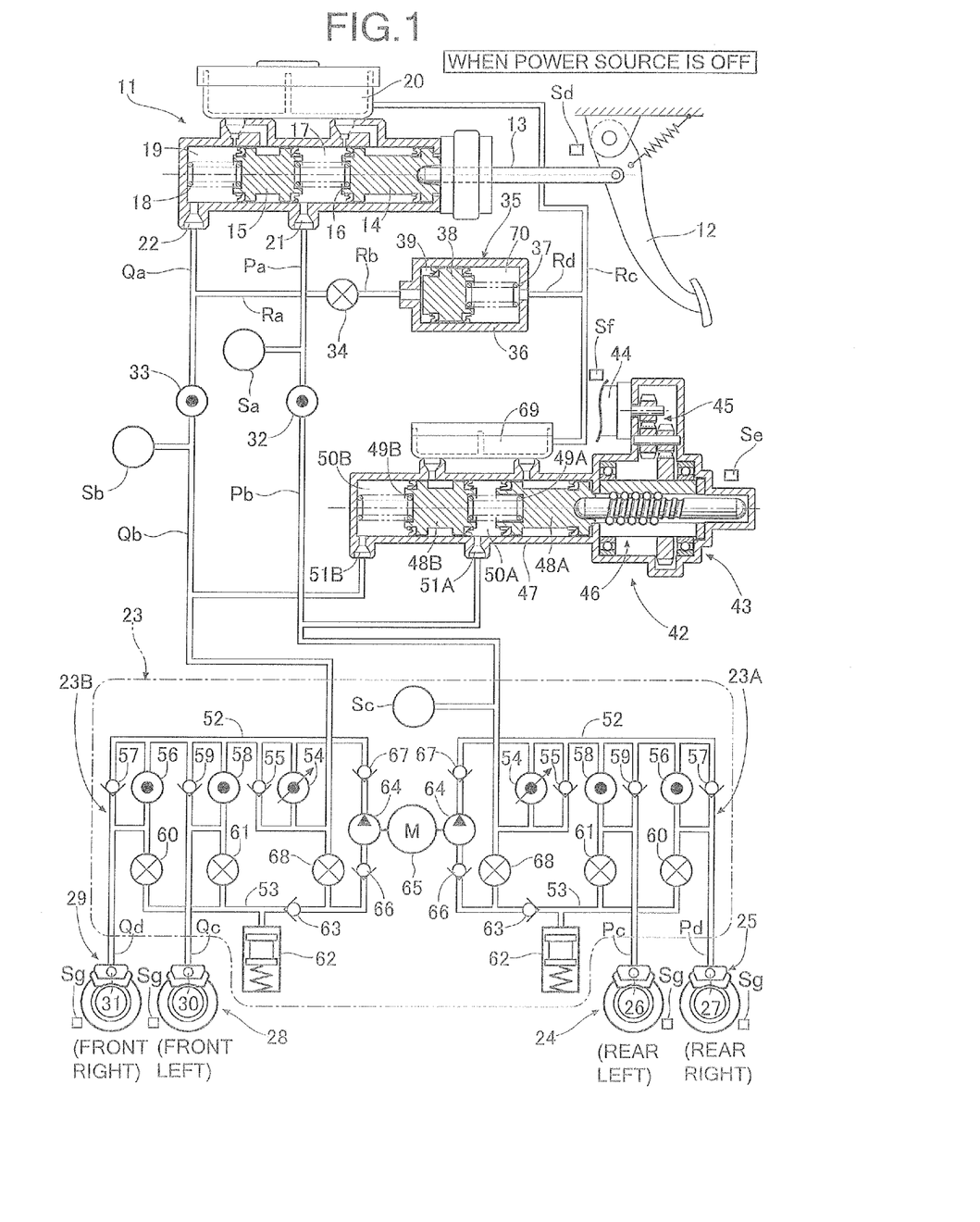
FIG. 1 is a hydraulic circuit diagram of a brake device for a vehicle. (first embodiment)

As shown in FIG. 1, a tandem type master cylinder 11 includes a first piston 14 that is connected via a push rod 13 to a brake pedal 12 operated by a driver, and a second piston 15 that is disposed in front of the first piston 14, a first fluid pressure chamber 17 housing a return spring 16 is defined between the first piston 14 and the second piston 15, and a second fluid pressure chamber 19 housing a return spring 18 is defined in front of the second piston 15. The first fluid pressure chamber 17 and the second fluid pressure chamber 19, which are capable of communicating with a reservoir 20, include a first output port 21 and a second output port 22 respectively. The first output port 21 is connected to for example wheel cylinders 26 and 27 (first line) of disk brake devices 24 and 25 of rear left and right wheels via fluid paths Pa and Pb, a VSA (vehicle stability assist) device 23, and fluid paths Pc and Pd. The second output port 22 is connected to for example wheel cylinders 30 and 31 (second line) of disk brake devices 28 and 29 of front left and right wheels via fluid paths Qa and Qb, the VSA device 23, and fluid paths Qc and Qd.

In the present specification, upstream sides of the fluid paths Pa to Pd and the fluid paths Qa to Qd mean the master cylinder 11 side, and downstream sides mean the wheel cylinders 26 and 27; 30 and 31 sides.

A first master cut valve 32, which is a normally open solenoid valve, is disposed between the fluid paths Pa and Pb, and a second master cut valve 33, which is a normally open solenoid valve, is disposed between the fluid paths Qa and Qb. Supply-side fluid paths Ra and Rb branching from the fluid path Qa on the upstream side of the second master cut valve 33 are connected to a stroke simulator 35 via a simulator valve 34, which is a normally closed solenoid valve. The stroke simulator 35 has a piston 38, urged by a spring 37, slidably fitted into a cylinder 36, and a fluid pressure chamber 39 formed on the side of the piston 38 opposite to the spring 37 communicates with the supply-side fluid path Rb.

A tandem type slave cylinder 42 is connected to the fluid path Pb and the fluid path Qb on the downstream side of the first and second master cut valves 32 and 33. An actuator 43 that actuates the slave cylinder 42 transmits rotation of a motor 44 to a ball screw mechanism 46 via a gear train 45. Slidably fitted into a cylinder main body 47 of the slave cylinder 42 are a first piston 48A driven by the ball screw mechanism 46 and a second piston 48B positioned in front of the first piston 48A. A first fluid pressure chamber 50A housing a return spring 49A is defined between the first piston 48A and the second piston 48B, and a second fluid pressure chamber 50B housing a return spring 49B is defined in front of the second piston 48B. When the first and second pistons 48A and 48B are driven in the forward direction by means of the ball screw mechanism 46 of the actuator 43, a brake fluid pressure generated in the first and second fluid pressure chambers 50A and 50B is transmitted to the fluid paths Pb and Qb via first and second output ports 51A and 51B.

A reservoir 69 of the slave cylinder 42 and the reservoir 20 of the master cylinder 11 are connected via a discharge-side fluid path Rc, and a back chamber 70 of the piston 38 of the stroke simulator 35 is connected to an intermediate part of the discharge side fluid path Rc via a discharge side fluid path Rd.

The structure of the VSA device 23 is well known; a first brake actuator 23A for controlling the first line of the disk brake devices 24 and 25 for the rear left and right wheels and a second brake actuator 23B for controlling the second line of the disk brake devices 28 and 29 for the front left and right wheels are provided, these having identical structures.

The first brake actuator 23A of the first line of the disk brake devices 24 and 25 for the rear left and right wheels is explained below as being representative thereof.

The first brake actuator 23A is disposed between the fluid path Pb, which is connected to the first master cut valve 32 positioned on the upstream side, and the fluid paths Pc and Pd, which are connected respectively to the wheel cylinders 26 and 27 for the rear left and right wheels positioned on the downstream side.

The first brake actuator 23A includes a fluid path 52 and a fluid path 53 that are common to the wheel cylinders 26 and 27 of the rear left and right wheels, and includes a regulator valve 54 that is a normally open solenoid valve with a variable degree of opening and that is disposed between the fluid path Pb and the fluid path 52, a check valve 55 that is disposed in parallel to the regulator valve 54 and allows brake fluid to flow from the fluid path Pb side to the fluid path 52 side, an in-valve 56 that is a normally open solenoid valve and is disposed between the fluid path 52 and the fluid path Pd, a check valve 57 that is disposed in parallel to the in-valve 56 and allows brake fluid to flow from the fluid path Pd side to the fluid path 52 side, an in-valve 58 that is a normally open solenoid valve and is disposed between the fluid path 52 and the fluid path Pc, a check valve 59 that is disposed in parallel to the in-valve 58 and allows brake fluid to flow from the fluid path Pc side to the fluid path 52 side, an out valve 60 that is a normally closed solenoid valve and is disposed between the fluid path Pd and the fluid path 53, an out valve 61 that is a normally closed solenoid valve and is disposed between the fluid path Pc and the fluid path 53, a reservoir 62 that is connected to the fluid path 53, a check valve 63 that is disposed between the fluid path 53 and the fluid path Pb and allows brake fluid to flow from the fluid path 53 side to the fluid path Pb side, a pump 64 that is disposed between the fluid path 52 and the fluid path 53 and supplies brake fluid from the fluid path 53 side to the fluid path 52 side, a motor 65 that drives the pump 64, a pair of check valves 66 and 67 that are provided on the intake side and the discharge side of the pump 64 and prevent the backflow of brake fluid, and a suction valve 68 that is a normally closed solenoid valve and is disposed between the fluid path Pb and an intermediate position between the check valve 63 and the pump 64.

The motor 65 is used in common among the pumps 64 and 64 of the first and second brake actuators 23A and 23B, but it is also possible to provide motors 65 and 65 that are exclusively used for the respective pumps 64 and 64.

Figure 2:
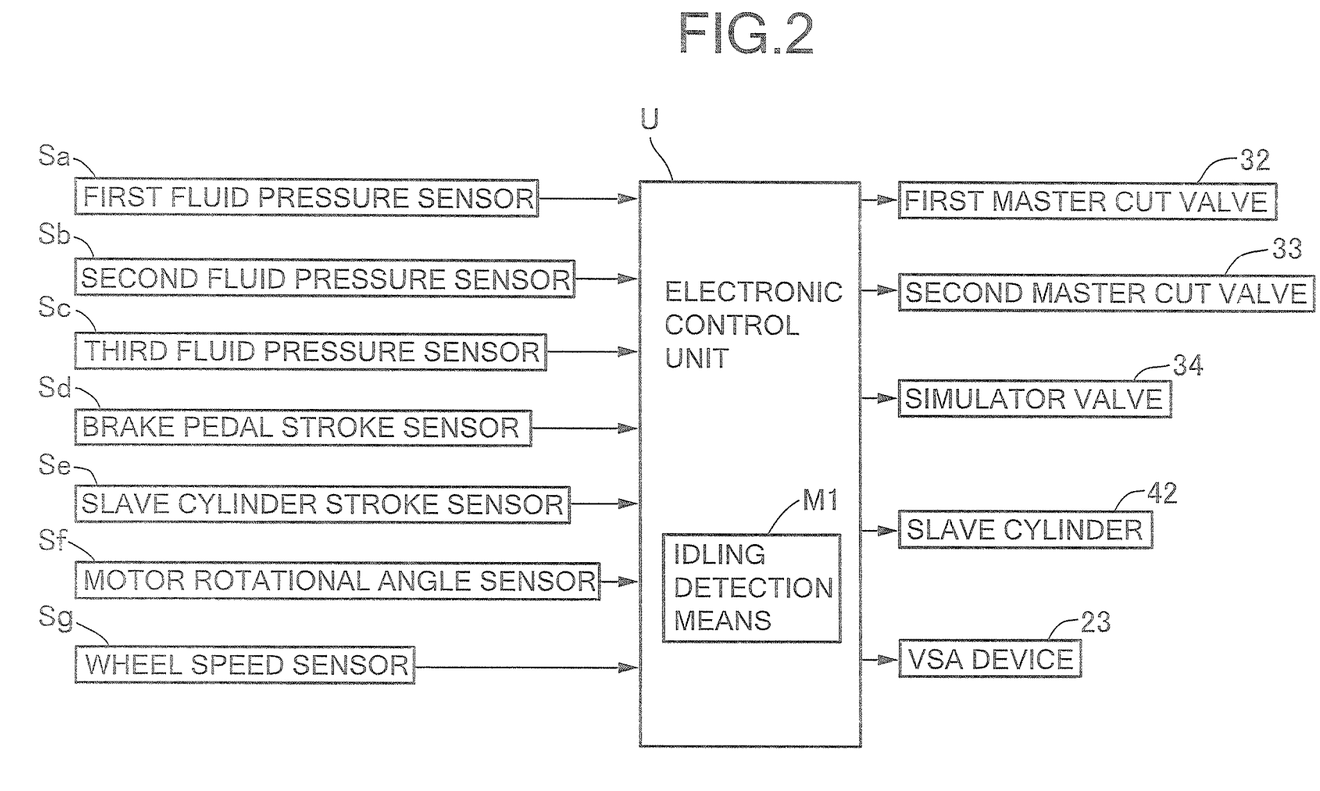
FIG. 2 is a diagram showing the arrangement of a control system for the brake device for a vehicle. (first embodiment)

As shown in FIG. 1 and FIG. 2, connected to the fluid path Pa upstream of the first master cut valve 32 is a first fluid pressure sensor Sa that detects a fluid pressure therein, connected to the fluid path Qb downstream of the second master cut valve 33 is a second fluid pressure sensor Sb that detects a fluid pressure therein, and connected to the fluid path Pb downstream of the first master cut valve 32 is a third fluid pressure sensor Sc that detects a fluid pressure therein. As the third fluid pressure sensor Sc, a fluid pressure sensor for controlling the VSA device 23 is used as it is.

Connected to an electronic control unit U connected to the first and second master cut valves 32 and 33, the simulator valve 34, the slave cylinder 42, and the VSA device 23 are the first fluid pressure sensor Sa, the second fluid pressure sensor Sb, the third fluid pressure sensor Sc, a brake pedal stroke sensor Sd that detects a stroke of the brake pedal 12, a slave cylinder stroke sensor Se that detects a stroke of the slave cylinder 42, a motor rotational angle sensor Sf that detects a rotational angle of the motor 44, and wheel speed sensors Sg that detect a wheel speed of each wheel.

The electronic control unit U is provided with idling detection means M1 in order to detect that the motor 44 is in an idling state, that is, a state in which the motor 44 has come off from the slave cylinder 42 or the motor 44 is rotating with no load or a low load due to the gear train 45 of the actuator 43 or the ball screw mechanism 46 being broken.

The operation of the embodiment of the present invention having the above arrangement is now explained.

Figure 3:
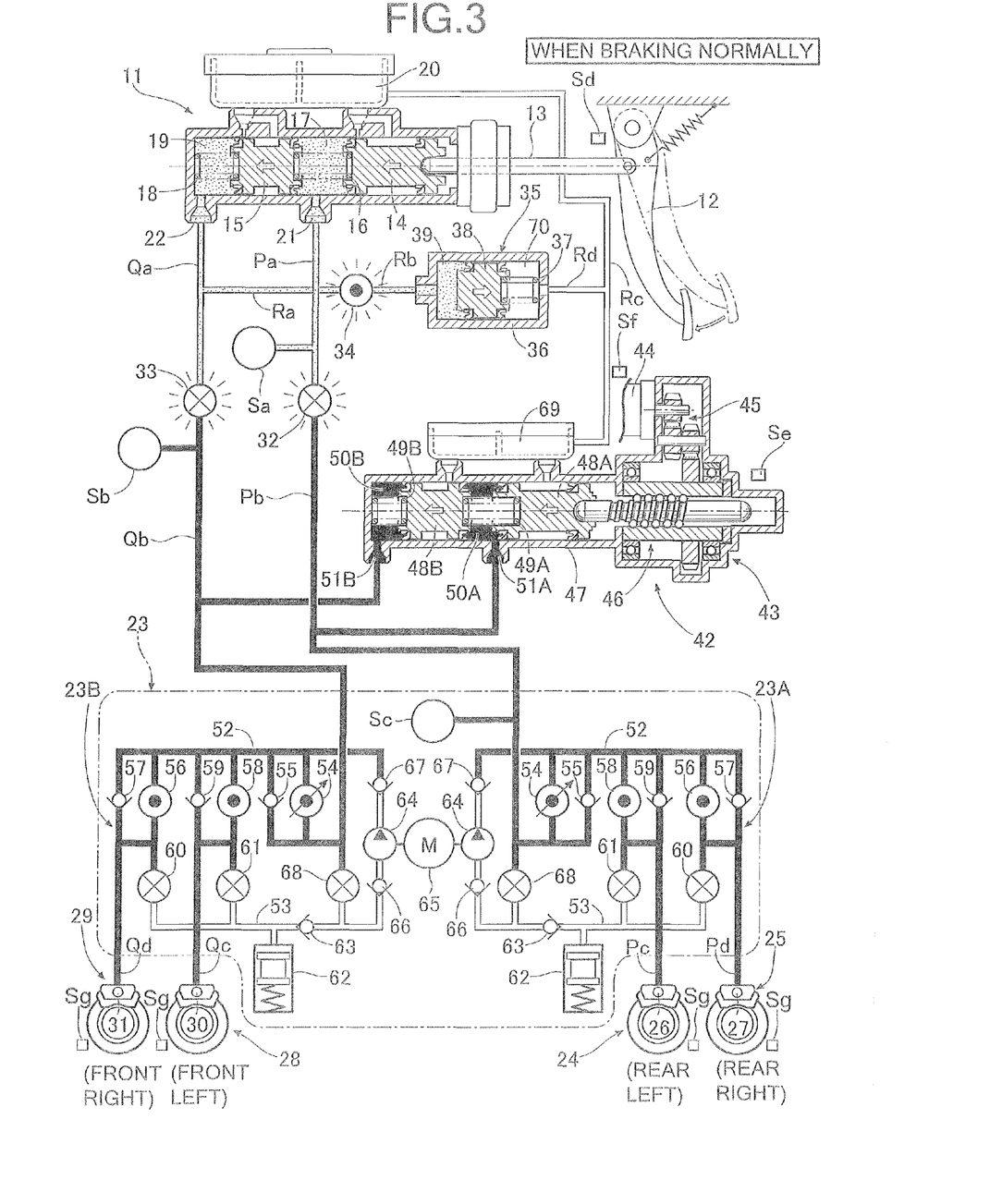
FIG. 3 is a hydraulic circuit diagram at a time of normal braking of the brake device for a vehicle. (first embodiment)

A normal braking operation when the situation is normal is first explained by reference to FIG. 3.

When the situation is normal and the system is functioning normally, when the first fluid pressure sensor Sa provided in the fluid path Pa detects depression of the brake pedal 12 by a driver, the first and second master cut valves 32 and 33, which are normally open solenoid valves, are energized and closed, and the simulator valve 34, which is a normally closed solenoid valve, is energized and opened. At the same time as this, the actuator 43 of the slave cylinder 42 is actuated, the first and second pistons 48A and 48B move forward, a brake fluid pressure is thereby generated in the first and second fluid pressure chambers 50A and 50B, and the brake fluid pressure is transmitted from the first and second output ports 51A and 51B to the fluid path Pb and the fluid path Qb and is transmitted from the two fluid paths Pb and Qb to the wheel cylinders 26 and 27; 30 and 31 of the disk brake devices 24 and 25; 28 and 29 via the opened in-valves 56 and 56; 58 and 58 of the VSA device 23, thus braking each wheel.

Furthermore, since the simulator valve 34, which is a normally closed solenoid valve, is energized and opened, a brake fluid pressure generated by the second fluid pressure chamber 19 of the master cylinder 11 is transmitted to the fluid pressure chamber 39 of the stroke simulator 35 via the opened simulator valve 34, the piston 38 thereof is moved against the spring 37, the brake pedal 12 is thus allowed to travel, and a simulated pedal reaction force is generated, thereby eliminating any uncomfortable sensation for the driver.

Controlling the actuation of the actuator 43 of the slave cylinder 42 such that the brake fluid pressure due to the slave cylinder 42 detected by the second fluid pressure sensor Sb provided in the fluid path Qb attains a level corresponding to the brake fluid pressure due to the master cylinder 11 detected by the first fluid pressure sensor Sa provided in the fluid path Pa enables a braking force that is commensurate with the amount of operation inputted by the driver into the brake pedal 12 to be generated in the disk brake devices 24 and 25; 28 and 29.

The operation of the VSA device 23 is now explained.

In a state in which the VSA device 23 is not being actuated, the regulator valves 54 and 54 are de-energized and opened, the suction valves 68 and 68 are de-energized and closed, the in-valves 56 and 56; 58 and 58 are de-energized and opened, and the out valves 60 and 60; 61 and 61 are de-energized and closed. Therefore, when the driver depresses the brake pedal 12 in order to carry out braking and the slave cylinder 42 is actuated, a brake fluid pressure outputted from the first and second output ports 51A and 51B of the slave cylinder 42 is supplied from the regulator valves 54 and 54 to the wheel cylinders 26 and 27; 30 and 31 via the in-valves 56 and 56; 58 and 58, which are in a valve-open state, thus braking the four wheels.

At the time of actuation of the VSA device 23, in a state in which the suction valves 68 and 68 are energized and opened the pumps 64 and 64 are driven by the motor 65, and brake fluid that has been taken in from the slave cylinder 42 side via the suction valves 68 and 68 and pressurized by the pumps 64 and 64 is supplied to the regulator valves 54 and 54 and the in-valves 56 and 56; 58 and 58. Therefore, energizing the regulator valves 54 and 54 and adjusting the degree of opening so as to regulate the brake fluid pressure of the fluid paths 52 and 52 and selectively supplying the brake fluid pressure to the wheel cylinders 26 and 27; 30 and 31 via the opened in-valves 56 and 56; 58 and 58 enables the braking forces for the four wheels to be controlled individually even in a state in which the driver is not depressing the brake pedal 12.

Therefore, it is possible to individually control the braking force for the four wheels by means of the first and second brake actuators 23A and 23B, thereby enhancing the performance in turning by increasing the braking force for the inner wheel when turning or enhancing the performance of straight-line stability by increasing the braking force for the outer wheel when turning.

Furthermore, while the driver is carrying out braking by depressing the brake pedal 12, if it is detected based on the output of the wheel speed sensors Sg that for example the rear left wheel is on a road with a low coefficient of friction and there is a tendency for it to lock, after the brake fluid pressure of the wheel cylinder 26 for the rear left wheel is released to the reservoir 62 and decreased to a predetermined pressure by energizing and closing one in-valve 58 of the first brake actuator 23A and energizing and opening one out valve 61, the out valve 61 is de-energized and closed, thereby maintaining the brake fluid pressure of the wheel cylinder 26 for the rear left wheel. As a result, when the tendency for the wheel cylinder 26 for the rear left wheel to lock starts to disappear, de-energizing and opening the in-valve 58 allows the brake fluid pressure from the first output port 51A of the slave cylinder 42 to be supplied to the wheel cylinder 26 for the rear left wheel, thus increasing it to a predetermined pressure and thereby increasing the braking force.

If the rear left wheel again has a tendency to lock due to this increase in pressure, repeating the pressure decrease→maintenance→pressure increase as above enables ABS (antilock brake system) control, which minimizes the braking distance, to be carried out while suppressing locking of the rear left wheel.

ABS control when the wheel cylinder 26 for the rear left wheel has a tendency to lock is explained above, but ABS control when the wheel cylinder 27 for the rear right wheel, the wheel cylinder 30 for the front left wheel, or the wheel cylinder 31 for the front right wheel has a tendency to lock can also be carried out in the same manner.

The operation when the slave cylinder 42 becomes incapable of being actuated due to a malfunction of a power source, etc. is now explained by reference to FIG. 4.

When a power source malfunctions, the first and second master cut valves 32 and 33, which are normally open solenoid valves, automatically open, the simulator valve 34, which is a normally closed solenoid valve, automatically closes, the in-valves 56 and 56; 58 and 58 and the regulator valves 54 and 54, which are normally open solenoid valves, automatically open, and the out valves 60 and 60; 61 and 61 and the suction valves 68 and 68, which are normally closed solenoid valves, automatically close. In this state, the brake fluid pressure generated in the first and second fluid pressure chambers 17 and 19 of the master cylinder 11 passes through the first and second master cut valves 32 and 33, the regulator valves 54 and 54, and the in-valves 56 and 56; 58 and 58 without being absorbed by the stroke simulator 35, thus enabling the wheel cylinders 26 and 27; 30 and 31 of the disk brake devices 24 and 25; 30 and 31 for the respective wheels to be actuated and a braking force to be generated without any problem.

In addition, a member for restricting rearward movement of the first and second pistons 48A and 48B when there is a malfunction of the slave cylinder 42 may be provided separately. In this case, a structure in which drive resistance is not increased during normal actuation is desirable.

Control of the slave cylinder 23 is now explained by reference to FIG. 5 and FIG. 6.

Figure 5:
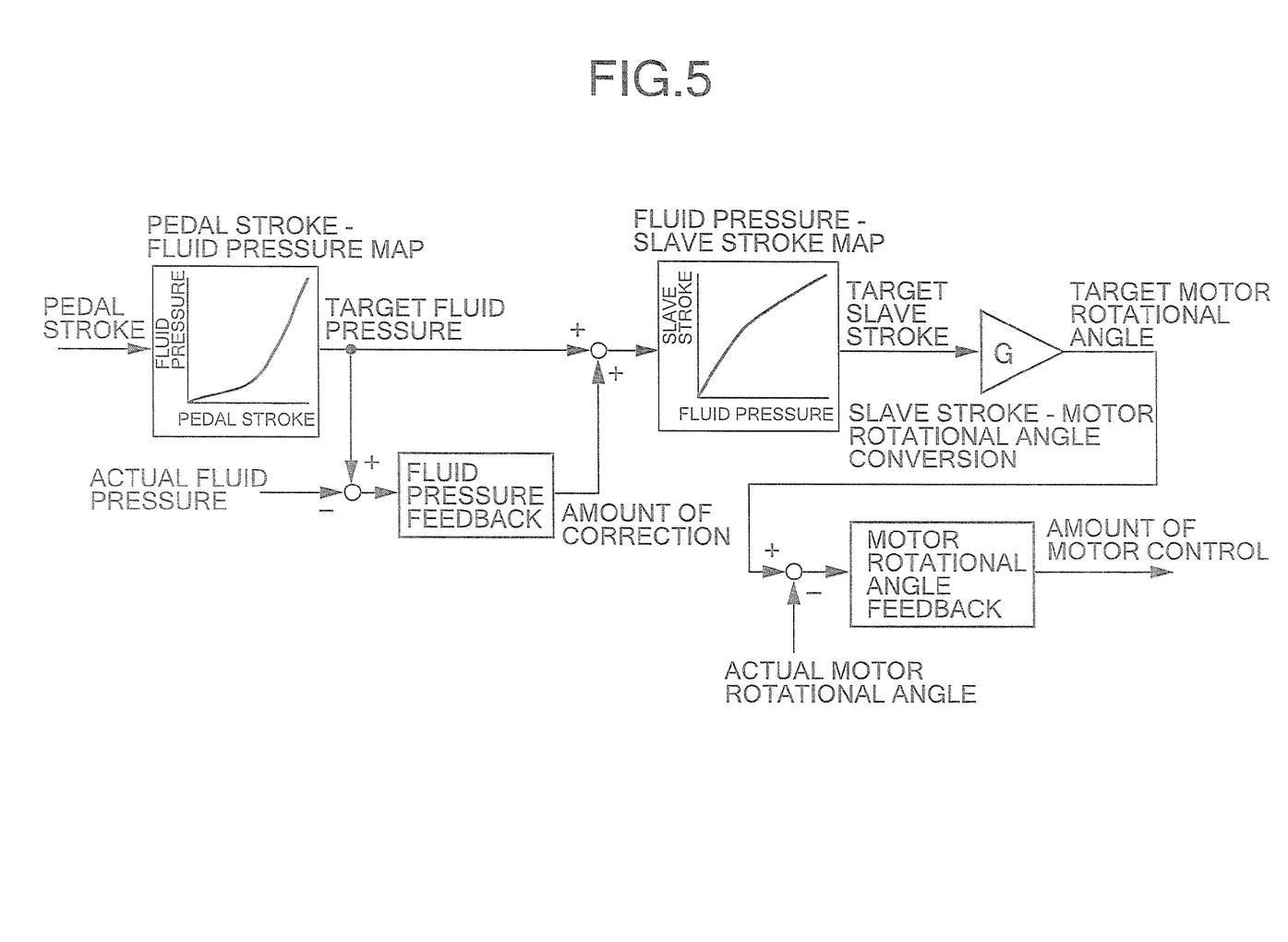
FIG. 5 is a block diagram of a control system for a slave cylinder. (first embodiment)
Figure 6:
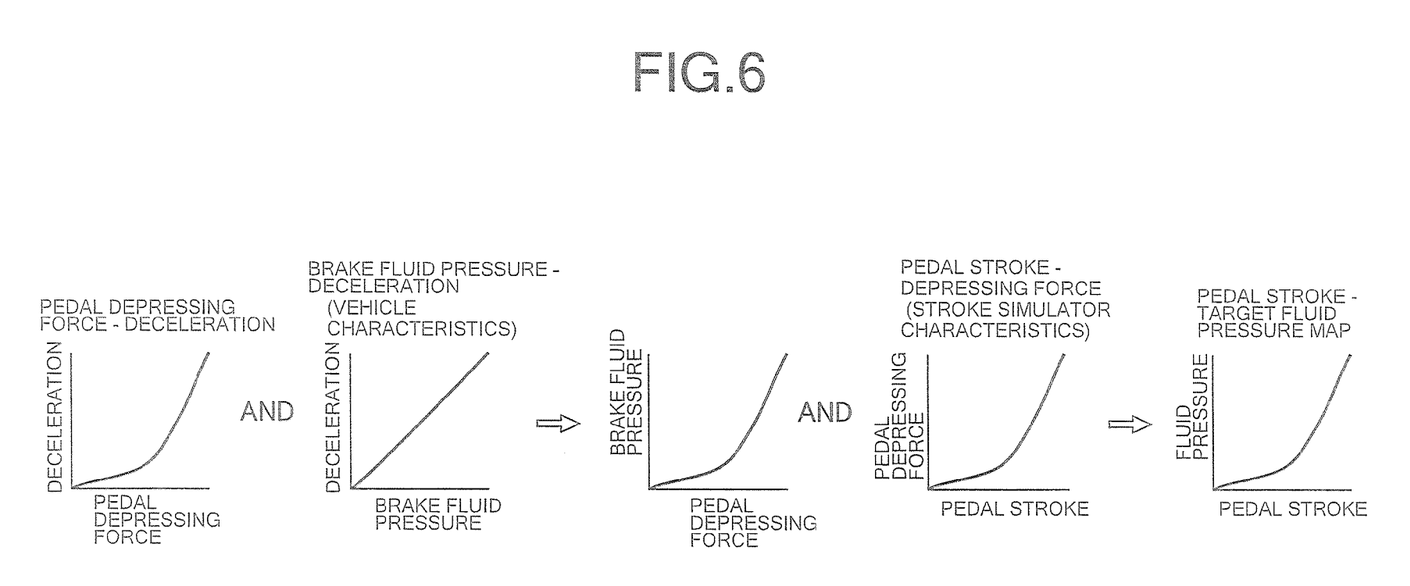
FIG. 6 is a diagram for explaining a method for calculating a pedal stroke-target fluid pressure map. (first embodiment)

As shown in FIG. 5, a stroke of the brake pedal 12 detected by the brake pedal stroke sensor Sd is converted into a target fluid pressure to be generated by the slave cylinder 42 using a pedal stroke-target fluid pressure map. This pedal stroke-target fluid pressure map is calculated by the procedure shown in FIG. 6.

That is, a map showing the relationship between the depressing force on the brake pedal 12 and the brake fluid pressure to be generated by the slave cylinder 42 is calculated from a map showing the relationship between the depressing force on the brake pedal 12 and the deceleration to be generated in the vehicle and a map showing the relationship between the brake fluid pressure generated by the slave cylinder 42 and the deceleration of the vehicle. Subsequently, a map (pedal stroke-target fluid pressure map) showing the relationship between the stroke of the brake pedal 12 and the target fluid pressure to be generated by the slave cylinder 42 is calculated from the above calculated map and a map showing the relationship between the stroke of the brake pedal 12 and the depressing force on the brake pedal 12.

Returning to FIG. 5, correction is carried out by calculating a deviation between the target fluid pressure to be generated by the slave cylinder 42 calculated from the pedal stroke-target fluid pressure map and the actual fluid pressure generated by the slave cylinder 42 and detected by the second fluid pressure sensor Sb, and adding to the target fluid pressure a fluid pressure correction amount calculated from the deviation. Subsequently, the corrected target fluid pressure is applied to the map showing the relationship between the fluid pressure generated by the slave cylinder 42 and the stroke of the slave cylinder 42, thus calculating a target stroke for the slave cylinder 42. Subsequently, a deviation between the target rotational angle for the motor 44 calculated by multiplying the target stroke for the slave cylinder 42 by a predetermined gain and the actual rotational angle of the motor 44 detected by the motor rotational angle sensor Sf is calculated, and driving the motor 44 with a motor control amount calculated from the above deviation allows the slave cylinder 42 to generate a brake fluid pressure corresponding to the stroke of the brake pedal 12 detected by the brake pedal stroke sensor Sd.

When the motor 44 has come off the slave cylinder 42, or the gear train 45 of the actuator 43 or the ball screw mechanism 46 is broken, the slave cylinder 42 cannot generate a brake fluid pressure, but since the motor 44 is rotating, the electronic control unit U does not determine that there is an abnormal state, and there is a possibility that back up by brake fluid pressure generated by the master cylinder 11 will be delayed.

However, in accordance with the present embodiment, the idling detection means M1 of the electronic control unit U detects idling of the motor 44 based on the actual stroke of the slave cylinder 42 detected by the slave cylinder stroke sensor Se and the motor rotational speed obtained by differentiating with respect to time the rotational angle of the motor 44 detected by the motor rotational angle sensor Sf.

Figure 7:
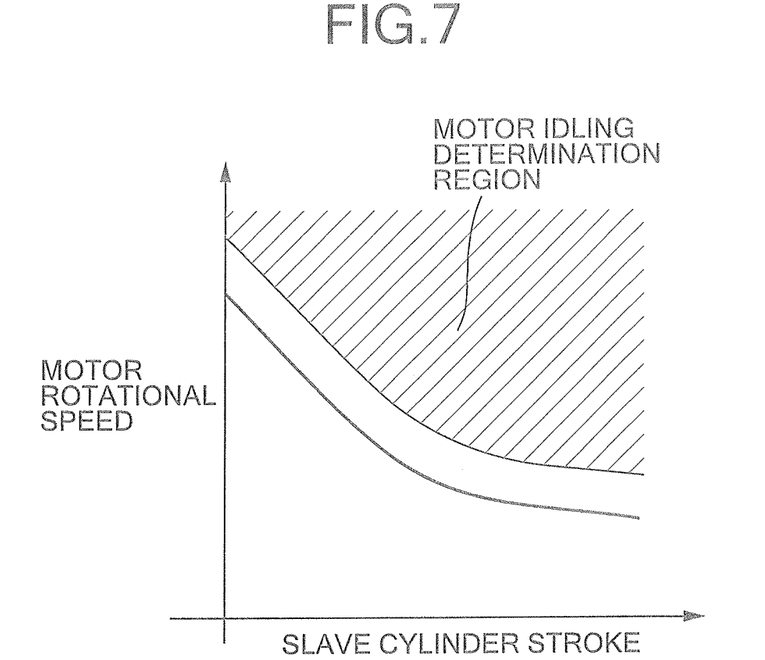
FIG. 7 is a diagram showing a map for determining idling of a motor. (first embodiment)

As shown in FIG. 7, the idling detection means M1 stores in advance a map showing the relationship between the slave cylinder stroke and the motor rotational speed (see thick solid line). As is clear from this map, it is set such that when the slave cylinder stroke is small, the motor rotational speed is high, and as the slave cylinder stroke increases the motor rotational speed decreases. The electronic control unit U controls the rotational speed of the motor 44 such that the motor rotational speed obtained by differentiating with respect to time the motor rotational angle detected by the motor rotational angle sensor Sf attains a value that is commensurate with the slave cylinder stroke detected by the slave cylinder stroke sensor Se.

If, during this process, the motor 44 idles for some reason, the rotational speed of the motor 44 exceeds a value decided from the map. Therefore, the hatched region is set in the map of FIG. 7, and idling of the motor 44 can reliably and rapidly be detected as being when the slave cylinder stroke and the motor rotational speed entering this region.

Figure 4:
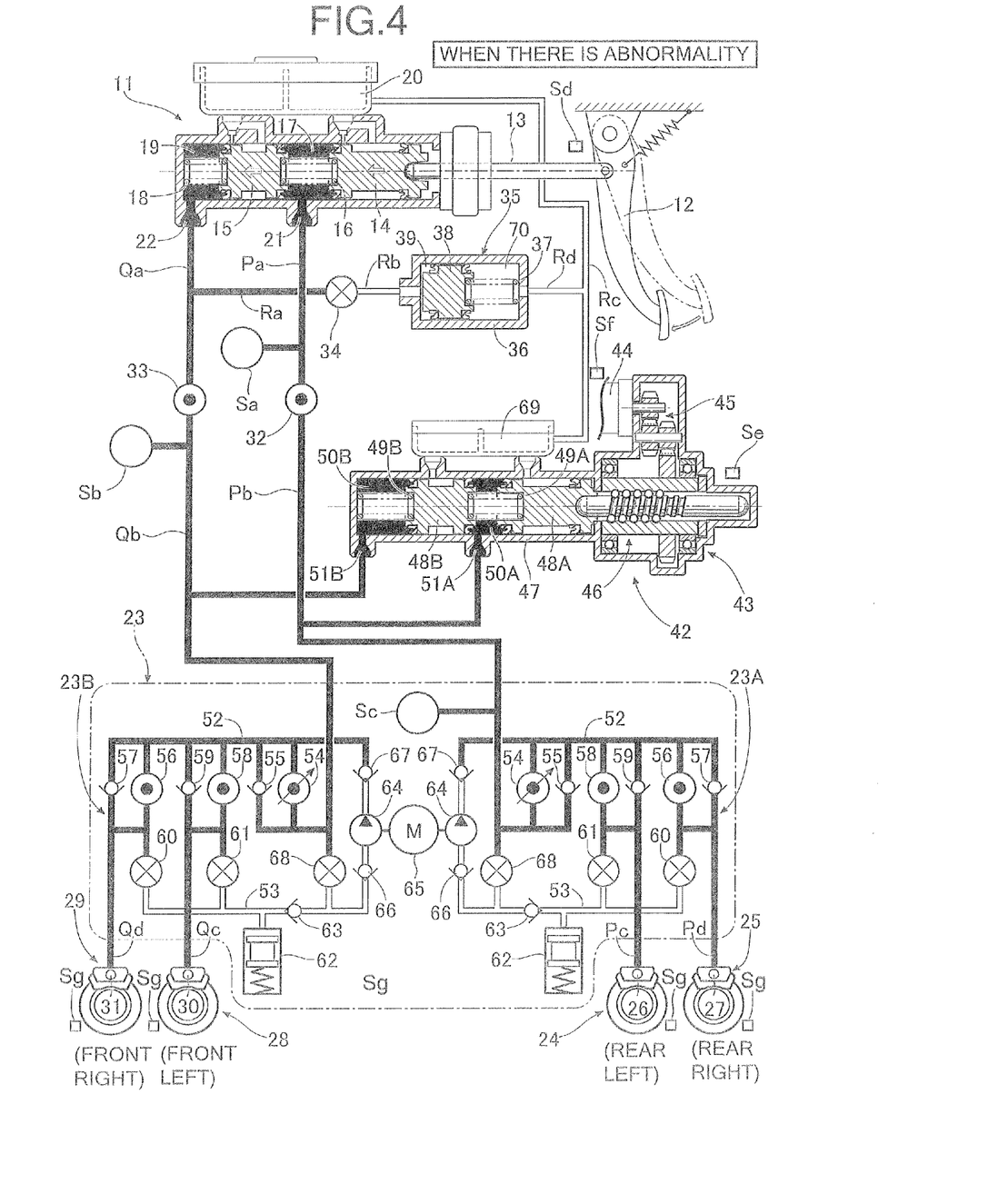
FIG. 4 is a hydraulic circuit diagram when there is an abnormality with the brake device for a vehicle. (first embodiment)

When idling of the motor 44 is detected, the electronic control unit U opens the first and second master cut valves 32 and 33, closes the simulator valve 34, opens the in-valves 56 and 56; 58 and 58 and the regulator valves 54 and 54, closes the out valves 60 and 60; 61 and 61 and the suction valves 68 and 68, stops actuation of the slave cylinder 42, and moves to the back up mode shown in FIG. 4, thereby rapidly switching from braking by means of brake fluid pressure generated by the slave cylinder 42 to braking by means of brake fluid pressure generated by the master cylinder 11 and eliminating any uncomfortable sensation for the driver.

A second embodiment of the present invention is now explained by reference to FIG. 8.

Second Embodiment

The second embodiment is different from the first embodiment only with respect to the function of idling detection means M1, the arrangement otherwise being the same.

Figure 8:
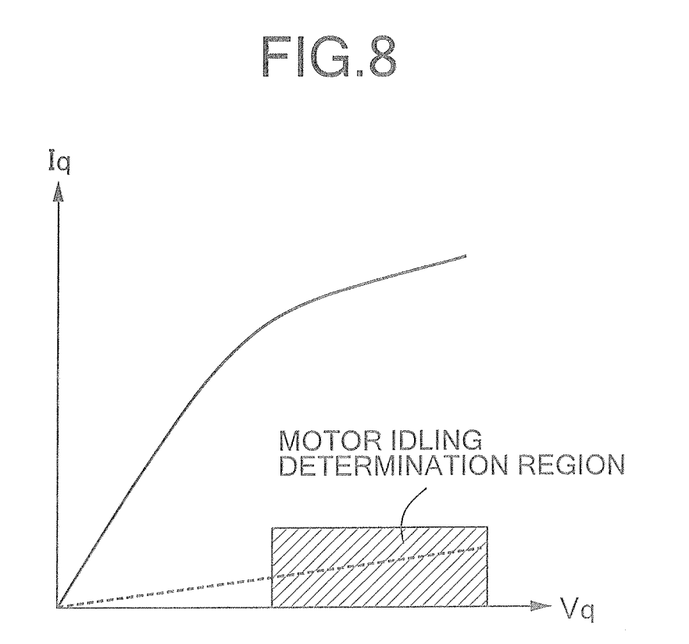
FIG. 8 is a diagram showing a map for determining idling of a motor. (second embodiment)

FIG. 8 is a map showing the relationship between a torque current Iq and an indicated voltage Vq of a motor 44, which is subject to vector control. When the situation is normal, that is, when the motor 44 is not idling, as shown by the solid line, as the indicated voltage Vq increases the torque current Iq increases at a constant rate of increase, and when the indicated voltage Vq further increases the rate of increase for the torque current Iq gradually decreases. On the other hand, when there is an abnormal situation, that is, when the motor 44 is idling, as shown by the broken line, as the indicated voltage Vq increases the torque current Iq increases at a constant rate of increase that is much lower than that when the situation is normal.

By setting the hatched region in the map of FIG. 8 it is therefore possible to reliably and rapidly detect idling of the motor 44 as being when the indicated voltage Vq and the torque current Iq of the motor 44 enter this region.

However, if one of first and second lines of a slave cylinder 42 experiences a leak malfunction, almost no burden is imposed on the motor 44 until the volume of the one that experiences the malfunction among first and second fluid pressure chambers 50A and 50B is lost and the one that is normal generates a brake fluid pressure, and there is a possibility that the above method would not be able to discriminate idling of the motor 44 from a leak malfunction.

In this case, idling is detected by waiting until the slave cylinder stroke detected by the slave cylinder stroke sensor Se attains a level (for example 20 mm) at which a brake fluid pressure is generated in the fluid pressure chamber 50A, 50B on the normal side, and then using the map, thereby reliably discriminating between a leak malfunction of the slave cylinder 42 and idling of the motor 44.

A third embodiment of the present invention is now explained.

Third Embodiment

The third embodiment is targeted at an electric automobile using a drive motor as a drive source for travel or a hybrid vehicle equipped with a drive motor other than an engine as a drive source for travel.

In the first and second embodiments, until the first and second master cut valves 32 and 33 are opened after the idling detection means M1 detects idling of the motor 44 of the slave cylinder 42, there is a possibility that deceleration of the vehicle will decrease due to a temporary drop in braking force. In the present embodiment, until first and second master cut valves 32 and 33 are opened after idling detection means M1 detects idling of a motor 44 of a slave cylinder 42, a regenerative braking force generated by a drive motor that functions as auxiliary braking means of the present invention is temporarily increased. This enables a temporary drop in the braking force to be compensated for by the regenerative braking force of the drive motor, thereby avoiding any decrease in deceleration of the vehicle.

Embodiments of the present invention are explained above, but the present invention may be modified in a variety of ways as long as the modifications do not depart from the spirit and scope thereof.

For example, in the embodiments motor rotational speed is detected by differentiating with respect to time the motor rotational angle detected by the motor rotational angle sensor Sf, but motor rotational speed may be detected directly by means of a motor rotational speed sensor.

The invention claimed is:

1. A brake device for a vehicle, said brake device comprising
    a master cylinder that generates a brake fluid pressure by operation of a brake pedal,
    a stroke simulator that imparts a reaction force to the operation of the brake pedal,
    a plurality of wheel cylinders each of which brakes a wheel,
    a master cut valve that is capable of blocking a fluid path providing a connection between the master cylinder and the wheel cylinders,
    a slave cylinder that is disposed between the master cut valve and the wheel cylinder and generates a brake fluid pressure that is commensurate with the operation of the brake pedal, and
    a control unit that, when the brake pedal is operated, closes the master cut valve and actuates the slave cylinder in a state in which the stroke simulator is capable of being actuated, in which
    the slave cylinder includes:
    a cylinder main body;
    first and second pistons that are slidably fitted into the cylinder main body and urged by springs in respective return directions;
    a first fluid pressure chamber that is adjacent to a front surface of the first piston and communicates with some of the plurality of wheel cylinders forming a first line;
    a second fluid pressure chamber that is adjacent to a front surface of the second piston and communicated with some of the plurality of wheel cylinders forming a second line; and
    a motor that drives the first and second pistons forward when operated to rotate, and
    the motor is operated to rotate in accordance with a depressing operation of the brake pedal so as to change a stroke of the slave cylinder, wherein
    the brake device further comprises
    an idling detection unit that detects idling of the motor of the slave cylinder, wherein
    when the stroke of the slave cylinder in a braking process is equal to or above a predetermined stroke in which even if one of the first and second fluid pressure chambers can not generate a brake fluid pressure, the other can generate it, the idling detection unit detects idling of the motor, and
    when idling of the motor is detected, the control unit opens the master cut valve and actuates the entire plurality of wheel cylinders by means of brake fluid pressure generated by the master cylinder.

2. A brake device for a vehicle according to claim 1, wherein the idling detection unit detects idling of the motor by comparing a torque current value and an indicated voltage value of the motor.

3. The brake device for a vehicle according to claim 2, further comprising an auxiliary braking unit that carries out braking of a wheel in place of the slave cylinder until the master cut valve is opened.

4. The brake device for a vehicle according to claim 2, further comprising an auxiliary braking unit that carries out braking of a wheel in place of the slave cylinder until the master cut valve is opened.

5. The brake device for a vehicle according to claim 1, wherein the idling detection unit detects idling of the motor when a rotational speed of the motor is larger than a reference value that is set according to a stroke of the slave cylinder.

* * * * *